(12) United States Patent
Tsukamoto et al.

(10) Patent No.: US 9,976,468 B2
(45) Date of Patent: May 22, 2018

(54) CONSTRUCTION MACHINE

(71) Applicant: KOBELCO CONSTRUCTION MACHINERY CO., LTD., Hiroshima-shi (JP)

(72) Inventors: Hironori Tsukamoto, Hiroshima (JP); Kazuki Shinamura, Hiroshima (JP); Masafumi Yoneda, Hiroshima (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 0 days. days.

(21) Appl. No.: 15/678,151

(22) Filed: Aug. 16, 2017

(65) Prior Publication Data

US 2018/0066564 A1  Mar. 8, 2018

(30) Foreign Application Priority Data

Sep. 6, 2016  (JP) .................. 2016-173562

(51) Int. Cl.
| | |
|---|---|
| *B60K 13/04* | (2006.01) |
| *F01N 13/18* | (2010.01) |
| *F01N 13/00* | (2010.01) |
| *E02F 9/08* | (2006.01) |

(52) U.S. Cl.
CPC .......... *F01N 13/1805* (2013.01); *B60K 13/04* (2013.01); *F01N 13/009* (2014.06); *B60Y 2200/412* (2013.01); *E02F 9/0866* (2013.01); *F01N 2470/18* (2013.01); *F01N 2590/08* (2013.01)

(58) Field of Classification Search
CPC ...... F02M 35/162; B60K 13/04; F01N 13/105
See application file for complete search history.

(56) References Cited

U.S. PATENT DOCUMENTS

| | | |
|---|---|---|
| 2010/0269494 A1 | 10/2010 | Saito et al. |
| 2016/0215477 A1* | 7/2016 | Kumagai ............... B60K 13/04 |

FOREIGN PATENT DOCUMENTS

| | | |
|---|---|---|
| DE | 11 2013 000 286 T5 | 8/2014 |
| JP | 2015-140641 | 8/2015 |

OTHER PUBLICATIONS

European Extended Search Report dated Jan. 29, 2018 in European Application No. 17187652.7, 5 pages.

* cited by examiner

*Primary Examiner* — John D Walters
*Assistant Examiner* — James J Triggs
(74) *Attorney, Agent, or Firm* — Oblon, McClelland, Maier & Neustadt, L.L.P.

(57) ABSTRACT

Provided is a construction machine in which the weight of a top plate of an aftertreatment device mount is reduced without reducing the rigidity of the top plate. In a construction machine where a vehicle body frame for mounting an engine is equipped with an aftertreatment device mount for supporting an exhaust gas aftertreatment device, a mount top plate of the aftertreatment device mount includes a support on which the exhaust gas aftertreatment device is placed, a pair of outer walls extending parallel, a groove portion parallel to the outer walls, a connecting portion provided on the support, and an upper reinforcing member orthogonal to the groove portion at a position of the connecting portion. The upper reinforcing member includes a first reinforcing portion for reinforcing the connecting portion and a second reinforcing portion to be fitted in the groove portion.

5 Claims, 6 Drawing Sheets

CONSTRUCTION MACHINE

TECHNICAL FIELD

The present invention relates to a construction machine, such as a hydraulic excavator, and more particularly to a construction machine with an aftertreatment device mount for supporting an exhaust gas aftertreatment device connected to an exhaust system of an engine.

BACKGROUND ART

In a hydraulic excavator as an example of a construction machine, a vehicle body generally includes a lower traveling body capable of self-traveling and an upper slewing body slewably mounted on the lower traveling body. The front of the upper slewing body is provided with a working device for carrying out excavation etc.

JP 2015-140641 A discloses an upper slewing body including a slewing frame (i.e., a vehicle body frame) as a structure for supporting a cab, an engine, a hydraulic pump, and the like. An exhaust gas aftertreatment device is connected to the exhaust side of the engine through an exhaust pipe. The exhaust gas aftertreatment device is supported on an aftertreatment device mount provided on the stewing frame.

When a diesel engine is used as the engine, the exhaust gas aftertreatment device may be a urea-selective catalytic reduction (SCR) system. This type of exhaust gas aftertreatment device tends to be large to meet recent exhaust gas regulations, and its weight is also increasing. In order to stably support such a heavy exhaust gas aftertreatment device, the aftertreatment device mount includes an iron mount top plate for supporting the exhaust gas aftertreatment device. A technique in which a mount top plate has sufficient rigidity by providing the mount top plate with an increased thickness dimension has been known.

However, increasing the rigidity of the mount top plate by providing the mount top plate with an increased thickness dimension also results in an increase in weight of the mount top plate itself. This undesirably increases the weight of the entire construction machine.

In view of the above, an object of the present invention is to provide a construction machine in which the weight of a top plate of an aftertreatment device mount is reduced while enhancing the rigidity of the top plate.

SUMMARY OF INVENTION

A construction machine is provided to achieve the above object. The construction machine includes a vehicle body frame for supporting an engine, an exhaust gas aftertreatment device connected to an exhaust system of the engine, an aftertreatment device mount for supporting the exhaust gas aftertreatment device. The aftertreatment device mount includes a top plate. The top plate includes: a pair of placement portions that extend in a first direction being horizontal, are spaced apart from each other in a second direction intersecting with the first direction and a vertical direction, and include placement surfaces on which the exhaust gas aftertreatment device is allowed to be placed, each of the placement surfaces of the pair of placement portions being provided with a connecting portion connected to the exhaust gas aftertreatment device at one or more predetermined positions in the first direction; a groove portion that is disposed between the pair of placement portions and connects the pair of placement portions to each other, the groove portion including a bottom disposed at a position lower than the placement surface and a pair of inner walls connecting the pair of placement surfaces to the bottom; a pair of outer walls that are connected to both side edges of the pair of placement portions in the second direction and extend in the first direction, the pair of outer walls being disposed to face the pair of inner walls in the second direction; and at least one reinforcing member disposed to extend in the second direction at a position corresponding to the connecting portion in the first direction. The at least one reinforcing member includes a pair of first reinforcing portions that are disposed on the placement surfaces of the pair of placement portions and are sandwiched between the placement surfaces and the exhaust gas aftertreatment device; and at least one second reinforcing portion that is fitted in the groove portion and connects the pair of first reinforcing portions in the second direction.

DESCRIPTION OF EMBODIMENTS

Figure 1:
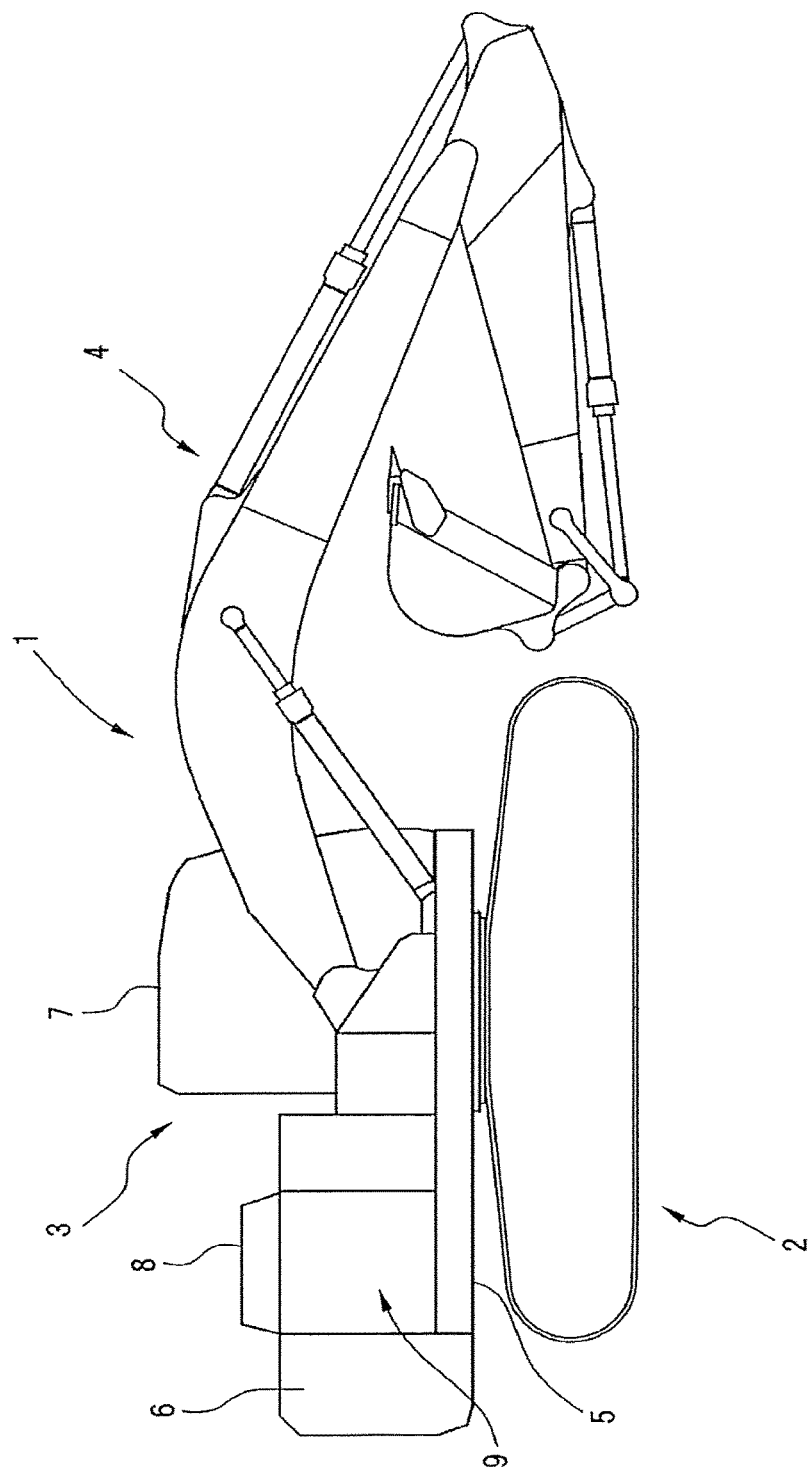
FIG. 1 is a schematic side view of a construction machine according to an embodiment of the present invention.
Figure 2:
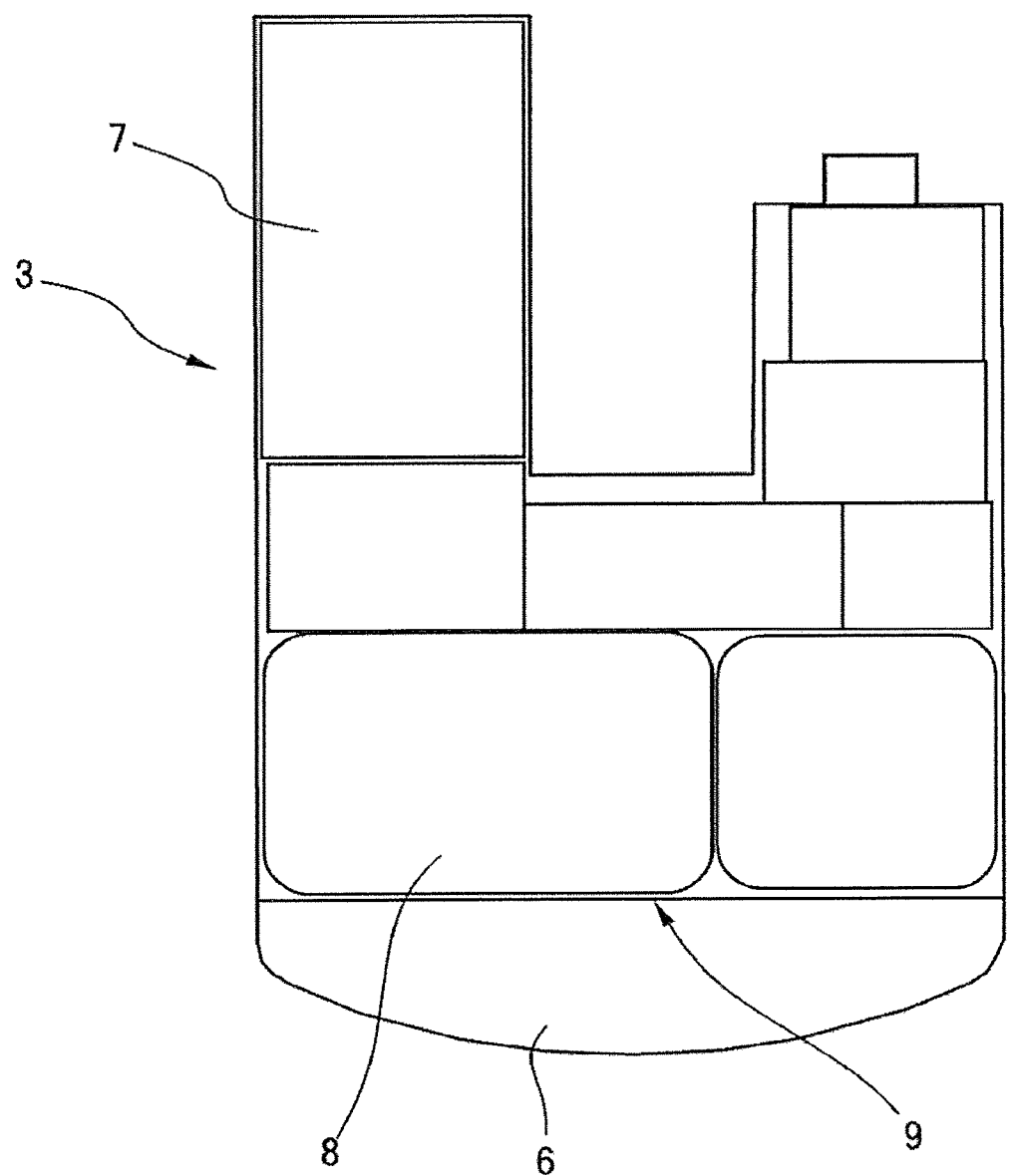
FIG. 2 is a schematic plan view of an upper slewing body of the construction machine according to the embodiment of the present invention.

An embodiment of the present invention is described with reference to the drawings. FIG. 1 is a schematic side view of a hydraulic excavator 1 (construction machine) according to the present embodiment. FIG. 2 is a schematic plan view of an upper slewing body 3 of the hydraulic excavator 1 according to the present embodiment. The hydraulic excavator 1 according to the present embodiment includes a crawler-type lower traveling body 2 capable of self-traveling, an upper slewing body 3 slewably mounted on the lower traveling body 2, and a working device 4. The working device 4 is provided on the upper slewing body 3, for example, to excavate the soil.

The upper slewing body 3 includes a slewing frame 5, as a vehicle body frame, slewably mounted on the lower traveling body 2. As illustrated in FIGS. 1 and 2, the hydraulic excavator 1 includes a counter weight 6 for balancing weight of the working device 4, a cab 7 occupied by an operator, a hood 8, and an engine housing 9. The engine housing 9 is provided in front of the counter weight 6 and is covered by the hood 8. The hydraulic excavator 1 also includes an engine (not shown) and an exhaust gas aftertreatment device 10 (see FIG. 3). The engine and exhaust gas aftertreatment device 10 are accommodated in the engine housing 9, and are supported by the slewing frame 5. The engine is, for example, a diesel engine.

The exhaust gas aftertreatment device 10, including, for example, a urea-selective catalytic reduction (SCR) system, is connected to an exhaust system of the engine (not shown) to remove nitrogen oxides (NOx) etc. contained in the exhaust gas discharged from the diesel engine.

Figure 3:
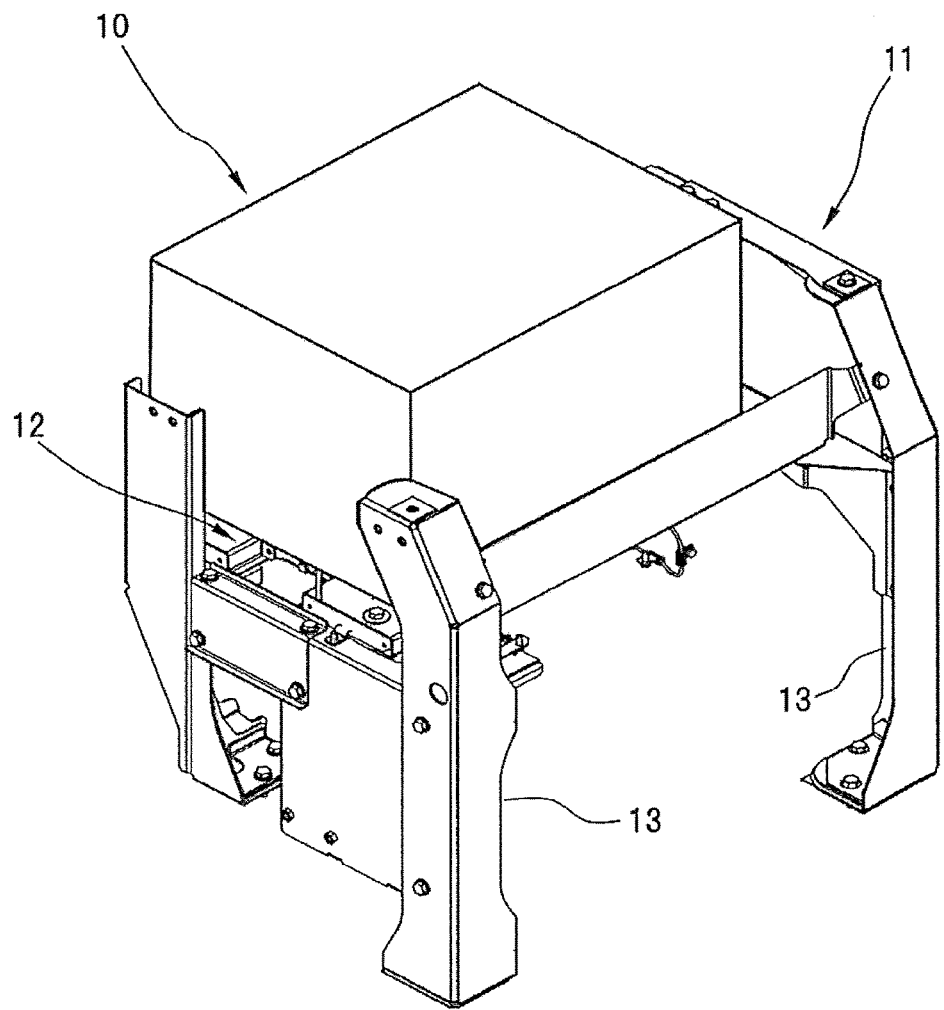
FIG. 3 is a perspective view of an aftertreatment device mount in the construction machine according to the embodiment of the present invention, in which the aftertreatment device mount supports an exhaust gas aftertreatment device.

The hydraulic excavator 1 also includes an aftertreatment device mount 11. FIG. 3 is a perspective view of the aftertreatment device mount 11 in the hydraulic excavator 1 according to the present embodiment, in which the aftertreatment device mount 11 supports the exhaust gas aftertreatment device 10. As illustrated in FIG. 3, the exhaust gas aftertreatment device 10, being supported by the aftertreatment device mount 11, is mounted on the slewing frame 5. The aftertreatment device mount 11 includes a mount top plate 12 (i.e., a top plate) and a plurality of legs 13 for horizontally supporting the mount top plate 12. The mount top plate 12 is connected to the exhaust gas aftertreatment device 10 by bolts or the like through a vibration absorbing member (connection member), such as mount rubber (not shown). In another embodiment, the mount top plate 12 may be directly connected to the exhaust gas aftertreatment device 10 without intervening the connection member.

The legs 13, the lower ends of which are connected to the clewing frame 5 (see FIG. 1), are erected as illustrated in FIG. 3.

Figure 4A:
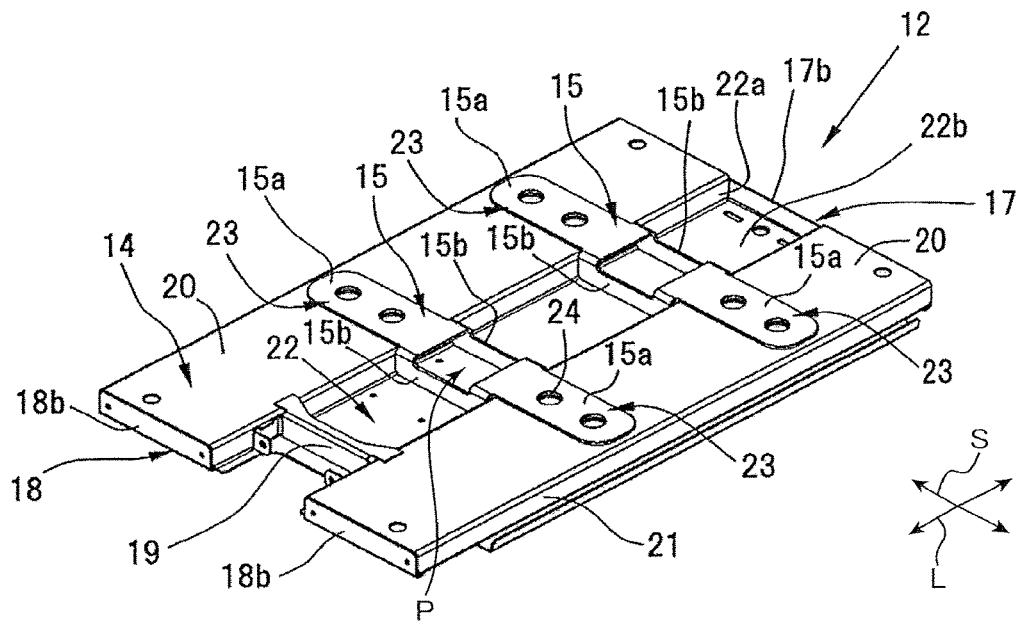
FIG. 4A is a perspective top view of a mount top plate in the construction machine according to the embodiment of the present invention.
Figure 4B:
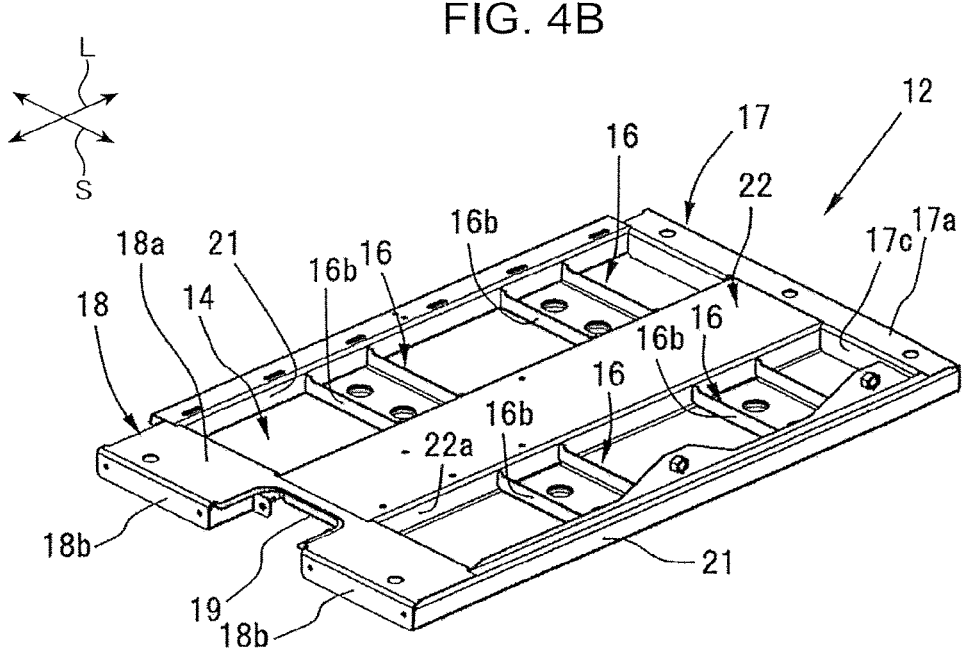
FIG. 4B is a perspective bottom view of the mount top plate.
Figure 5:
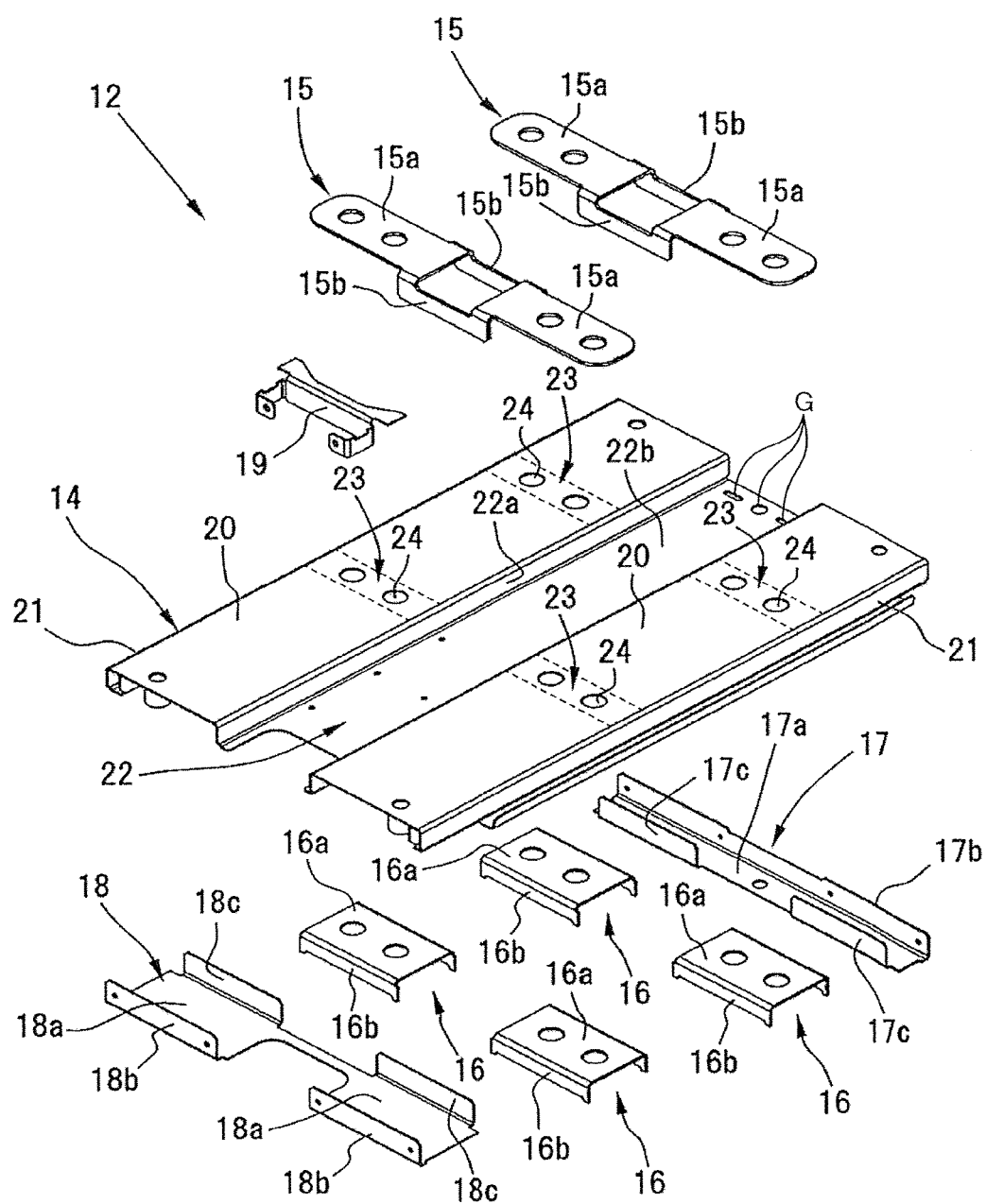
FIG. 5 is an exploded perspective view of the mount top plate in the construction machine according to the embodiment of the present invention.

FIG. 4A is a perspective top view of the mount top plate 12 according to the present embodiment, and FIG. 4B is a perspective bottom view of the mount top plate 12. FIG. 5 is an exploded perspective view of the mount top plate 12. The mount top plate 12 is formed in a substantially rectangular shape in plan view, as illustrated in FIGS. 4A and 4B, and includes a top plate body 14, a plurality of upper reinforcing members 15 (i.e., reinforcing members), a plurality of lower reinforcing members 16 (i.e., auxiliary reinforcing members), frame members (i.e., a first frame member 17 and a second frame member 18), and a groove closure member 19, as illustrated in FIG. 5. The top plate body 14 includes a pair of supports 20 (i.e., placement portions), a pair of outer walls 21, and a groove portion 22. Each of the pair of supports 20 includes a flat top surface (i.e., a placement surface). The exhaust gas aftertreatment device 10 is allowed to be placed on the top surface. In FIG. 4A, the longitudinal direction L (i.e., first direction) of the mount top plate 12 and the lateral direction S (i.e., second direction) orthogonal to the longitudinal direction of the mount top plate 12 are indicated by the respective arrows. The pair of supports 20 extend parallel to each other in the longitudinal direction L. The pair of outer walls 21 are disposed on both lateral sides of the top plate body 14, each of the outer walls 21 extending vertically downward from the edge of the support 20 and extending parallel to each other in the longitudinal direction. The groove portion 22 is disposed between the pair of supports 20 and extends in the longitudinal direction. The groove portion 22 connects the pair of supports 20 to each other. The supports 20, the outer walls 21, and the groove portion 22 are all formed by bending a single top plate body 14.

The pair of supports 20 are provided with a plurality of connecting portions 23 at predetermined positions in the longitudinal direction, at which the exhaust gas aftertreatment device 10 is connected. Each of the connecting portions 23 has a plurality of through-holes 24 into which fastening members such as bolts are inserted. The connecting portions 23 are indicated by broken lines in FIG. 5. The groove portion 22 includes a pair of groove sidewalls 22a (inner walls) that are recessed downwardly from the supports 20 and extend vertically downward, and a flat groove bottom 22b (bottom) connecting the lower edges of the pair of groove sidewalls 22a. In other words, the groove bottom 22b is disposed at a position lower than the top surface (placement surface) of the support 20. The pair of groove sidewalls 22a vertically connect the pair of placement surfaces to the groove bottom 22b.

The pair of outer walls 21 are connected to both lateral side edges of the pair of supports 20 and extend in the longitudinal direction. The pair of outer walls 21 are laterally opposed to the groove sidewalls 22a and, when the groove bottom 22b is assumed to be a reference surface, the support 20, the outer wall 21, and the groove sidewall 22a form an elongated convex shape. In other words, the groove sidewall 22a laterally separates a space below the support 20 from a space above the groove bottom 22b. The top plate body 14, having such a concavo-convex shape extending in one direction, forms a beam structure.

The upper reinforcing members 15 are disposed to extend laterally at positions corresponding to the connecting portions 23 in the longitudinal direction, thereby reinforcing the pair of supports 20 and the groove portion 22. As illustrated in FIG. 4A, the upper reinforcing member 15 includes a pair of first reinforcing portions 15a that overlap with the top surfaces of the connecting portions 23 of the supports 20 and a pair of second reinforcing portions 15b that laterally connect the pair of first reinforcing portions 15a to each other and are fitted in the groove portion 22. Although the upper reinforcing member 15 is strip-shaped, generally extending in one direction (lateral direction), the pair of first reinforcing portions 15a are plates that extend in the horizontal direction and face in the vertical direction as illustrated in FIG. 5, while the pair of second reinforcing portions 15b are U-shaped vertical walls that face each other in the horizontal direction, whereby an opening P is formed between the pair of second reinforcing portions 15b. The opening P not only reduces the weight of the upper reinforcing member 15, but also facilitates bending of the second reinforcing portions 15b with respect to the first reinforcing portions 15a in manufacturing the upper reinforcing member 15. Both lateral side edges (see a side edge 15b2 of FIG. 6) of the pair of second reinforcing portions 15b abut on the groove sidewalls 22a. The opening may not be disposed between the pair of second reinforcing portions 15b.

Figure 6:
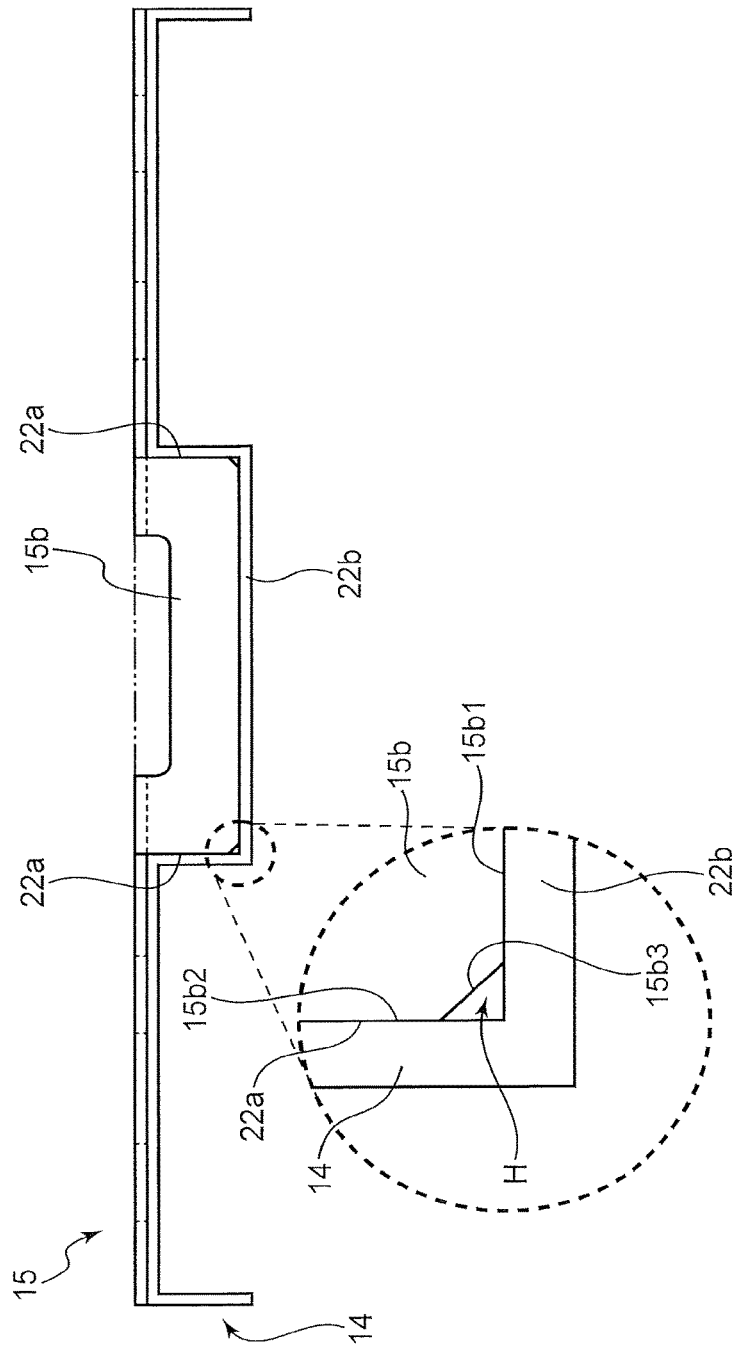
FIG. 6 is a cross-sectional view of the mount top plate in the construction machine according to the embodiment of the present invention.

As illustrated in FIG. 4A, the first reinforcing portions 15a of the upper reinforcing member 15 attached to the top plate body 14 overlap with the connecting portions 23 of the supports 20, thereby increasing the substantial thickness of the connecting portions 23. The first reinforcing portions 15a are sandwiched between the top surface of the support 20 and the exhaust gas aftertreatment device 10 (or the connection member). The second reinforcing portion 15b fitted in the groove portion 22 reliably prevents the distortion of the groove portion 22. This causes the upper reinforcing member 15 to reinforce the top plate body 14, thereby increasing the rigidity of the top plate body 14. A gap H is formed between the groove bottom 22b and the lower edge of the second reinforcing portion 15b. FIG. 6 is a cross-sectional view of the top plate body 14 and the reinforcing member 15 of FIG. 4 as viewed in the longitudinal direction in the vicinity of the reinforcing member 15. As illustrated in FIG. 6, the second reinforcing portion 15b includes a lower edge 15b1 (i.e., an abutment portion) abutting on the groove bottom 22b, a side edge 15b2 abutting on the groove sidewall 22a, and a cut-away portion 15b3 (i.e., a non-abutment portion) using a bending notch. The cut-away portion 15b3 is formed at the corner of the lower edge 15b1 and the side edge 15b2. The cut-away portion 15b3 is spaced apart from the groove bottom 22b and forms a gap H with the groove bottom 22b. The gap H allows liquid, such as water, to pass between the groove bottom 22b and the lower edge of the second reinforcing portion 15b. Thus, for example, water entering the groove portion 22 is not blocked by the second reinforcing portion 15b and is easily drained, so that contamination and corrosion of the mount top plate 12 can be prevented. Water etc. that has passed through the gap H can be discharged, for example, from holes G of FIG. 5. The first frame member 17 and the second frame member 18 may also be provided with cut-away portions using a bending notch described above, thus facilitating drainage.

An open side at one end of the groove portion 22 of the top plate body 14 in the longitudinal direction is closed by part of the first frame member 17, and an open side at the other end is closed by the groove closure member 19. The groove closure member 19, which is attached to the groove portion 22, has the effect of suppressing undesirable distortion of the groove portion 22 and improves the rigidity of the top plate body 14 in conjunction with the upper reinforcing member 15.

As illustrated in FIGS. 4B and 5, the lower reinforcing member 16 is secured to a surface, which is opposite to the placement surface, of the support 20 of the mount top plate 12 to laterally connect the outer wall 21 and the inner wall 22a of the groove portion 22. The lower reinforcing member 16 includes an abutment surface 16a abutting on the bottom surface (back surface) of the connecting portion 23 of the support 20 and a pair of vertical walls 16b contiguous with both ends (both ends in the longitudinal direction L) of the abutment surface 16a. Since the abutment surface 16a of the lower reinforcing member 16 overlaps with the connecting portion 23 of the support 20 from the back, the abutment surface 16a as well as the first reinforcing portion 15a increases the substantial thickness of the connecting portion 23. In other words, the lower reinforcing member 16 is disposed to overlap with the first reinforcing portion 15a of the reinforcing member 15 through the connecting portion 23, that is, to sandwich the connecting portion 23 between the lower reinforcing member 16 and the first reinforcing portion 15a of the reinforcing member 15. The pair of vertical walls 16b of the lower reinforcing member 16, which are positioned between the groove sidewall 22a and the outer wall 21, prevent the groove sidewall 22a and the outer wall 21 from being distorted toward each other. Preferably, both ends of the pair of vertical walls 16b abut on the groove sidewall 22a and the outer wall 21. More preferably, both ends of the abutment surface 16a abut on the groove sidewall 22a and the outer wall 21.

The first frame member 17 and the second frame member 18 are attached to longitudinal ends of the top plate body 14 as illustrated in FIG. 4B. As illustrated in FIG. 5, the first frame member 17 includes a first base 17a, a first outer frame piece 17b erected from the outer edge of the first base 17a, and a pair of first inner frame pieces 17c erected from the inner edge of the first base 17a opposite to the first outer frame piece 17b. The first outer frame piece 17b and the pair of first inner frame pieces 17c extend laterally with respect to the top plate body 14. The second frame member 18 includes a second base 18a, a pair of second outer frame pieces 18b erected from the outer edge of the second base 18a, and a pair of second inner frame pieces 18c erected from the inner edge of the second base 18a opposite to the second outer frame pieces 18b. The pair of second inner frame pieces 18c and the pair of second outer frame pieces 18b extend laterally with respect to the top plate body 14.

As illustrated in FIG. 4B, the first frame member 17 and the second frame member 18 are attached to both side edges, which intersect with the outer walls 21, of the top plate body 14, and thus the first frame member 17, the second frame member 18, and both outer walls 21 allow the mount top plate 12 to be a box structure with peripheral walls. That is, the first frame member 17 and the second frame member 18 close a space defined by the pair of supports 20 and the pair of outer walls 21 at both sides. Therefore, the rigidity of the mount top plate 12 increases without a significant increase in the weight of the mount top plate 12.

The above structure allows the mount top plate 12 according to the present embodiment to be made lighter by using relatively thin plate material and to obtain sufficient rigidity. Thus, the aftertreatment device mount 11 can stably support the exhaust gas aftertreatment device 10 as illustrated in FIG. 3.

A number of the upper reinforcing members 15 (i.e. two) and a number of the lower reinforcing members 16 (i.e. four) are not limited to the above embodiment and one or more upper and lower reinforcing members may be disposed. The lower reinforcing members 16 may not be disposed. Also, both the first frame member 17 and the second frame member 18 are not necessarily disposed, that is, either one of the first frame member 17 and the second frame member 18 may be disposed.

In the above embodiment, the hydraulic excavator 1 including the crawler-type lower traveling body 2 is described as an exemplary construction machine. However, the present invention is not limited thereto and may be applied to, for example, a hydraulic excavator including a wheel-type lower traveling body. In addition, the present invention can be broadly applied to other construction machines such as a wheel loader, a dump truck, a hydraulic crane, etc.

As described above, a construction machine is provided. The construction machine includes a vehicle body frame for supporting an engine, an exhaust gas aftertreatment device connected to an exhaust system of the engine, and an aftertreatment device mount for supporting the exhaust gas aftertreatment device. The aftertreatment device mount includes a top plate. The top plate includes a pair of placement portions, a groove portion, a pair of outer walls, and at least one reinforcing member. The pair of placement portions extend in the first direction being horizontal, are spaced apart from each other in the second direction intersecting with the first direction and the vertical direction, and include placement surfaces on which the exhaust gas aftertreatment device is allowed to be placed. Each of the placement surfaces of the pair of placement portions is provided with a connecting portion connected to the exhaust gas aftertreatment device at one or more predetermined positions in the first direction. The groove portion is disposed between the pair of placement portions and connects the pair of placement portions to each other. The groove portion includes a bottom disposed at a position lower than the placement surface and a pair of inner walls connecting the pair of placement surfaces to the bottom. The pair of outer walls are connected to both side edges of the pair of placement portions in the second direction and extend in the first direction. The pair of outer walls are disposed to face the pair of inner walls in the second direction. The at least one reinforcing member is disposed to extend in the second direction at a position corresponding to the connecting portion in the first direction. The at least one reinforcing member includes a pair of first reinforcing portions that are disposed on the placement surfaces of the pair of placement portions and are sandwiched between the placement surfaces and the exhaust gas aftertreatment device; and at least one second reinforcing portion that is fitted in the groove portion and connects the pair of first reinforcing portions in the second direction.

The top plate, where a beam structure is formed by the placement portions, the outer walls, and the groove portion extending parallel to each other, has high strength in the direction in which the placement portions, the outer walls, and the groove portion extend. Furthermore, in the connecting portion connected to the exhaust gas aftertreatment device, the first reinforcing portions of the reinforcing member are sandwiched between the connecting portions and the exhaust gas aftertreatment device and the second reinforcing portion is fitted in the groove portion, which increases strength in a direction orthogonal to the direction in which the placement portions, the outer walls, and the groove portion extend. Thus, according to the present invention, sufficient rigidity can be obtained even if the thickness dimension of the top plate is reduced, so that the thickness dimension of the top plate can be reduced, thereby facilitating weight reduction.

Preferably, the second reinforcing portion of the reinforcing member abuts on the bottom of the groove portion and the pair of inner walls.

Preferably, the construction machine further includes at least one auxiliary reinforcing member that is secured to a surface, which is opposite to the placement surface, of the placement portion and connects the outer wall and the inner wall of the groove portion in the second direction, the at least one auxiliary reinforcing member being disposed to sandwich the connecting portion between the at least one auxiliary reinforcing member and the first reinforcing portion of the reinforcing member.

This structure using the reinforcing member disposed on the top surface of the connecting portion and the auxiliary reinforcing member disposed on the bottom surface of the connecting portion provides strength equivalent to a structure in which the thickness of the connecting portion is partially increased, thus increasing the rigidity.

Preferably, the construction machine still further includes at least one frame member that is attached to the side edge, which intersects with the outer walls, of the mount top plate and closes a space defined by the outer walls and the placement portions at a side or sides. This provides a box-structured top plate with the outer walls and the at least one frame member, and high rigidity can be obtained while reducing the weight of the top plate.

Preferably, the second reinforcing portion of the reinforcing member includes an abutment portion abutting on the bottom and a non-abutment portion that is spaced apart from the bottom and forms a gap with the bottom. This prevents water from being blocked by the second reinforcing portion even if water enters the groove portion, and water is easily drained through the gap between the bottom of the groove portion and the second reinforcing portion.

This application is based on Japanese Patent application No. 2016-173562 filed in Japan Patent Office on Sep. 6, 2016, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A construction machine comprising:
   a vehicle body frame for supporting an engine;
   an exhaust gas aftertreatment device connected to an exhaust system of the engine; and
   an aftertreatment device mount for supporting the exhaust gas aftertreatment device,
   wherein the aftertreatment device mount includes a top plate,
   the top plate includes:
   a pair of placement portions that extend in a first direction being horizontal, are spaced apart from each other in a second direction intersecting with the first direction and a vertical direction, and include placement surfaces on which the exhaust gas aftertreatment device is allowed to be placed, each of the placement surfaces of the pair of placement portions being provided with a connecting portion connected to the exhaust gas aftertreatment device at one or more predetermined positions in the first direction;
   a groove portion that is disposed between the pair of placement portions and connects the pair of placement portions to each other, the groove portion including a bottom disposed at a position lower than the placement surface and a pair of inner walls connecting the pair of placement surfaces to the bottom;
   a pair of outer walls that are connected to both side edges of the pair of placement portions in the second direction and extend in the first direction, the pair of outer walls being disposed to face the pair of inner walls in the second direction; and
   at least one reinforcing member disposed to extend in the second direction at a position corresponding to the connecting portion in the first direction, and
   the at least one reinforcing member includes a pair of first reinforcing portions that are disposed on the placement surfaces of the pair of placement portions and are sandwiched between the placement surfaces and the exhaust gas aftertreatment device; and at least one second reinforcing portion that is fitted in the groove portion and connects the pair of first reinforcing portions in the second direction.

2. The construction machine according to claim 1, wherein
   the at least one second reinforcing portion of the at least one reinforcing member abuts on the bottom of the groove portion and the pair of inner walls.

3. The construction machine according to claim 1, further comprising:
   at least one auxiliary reinforcing member that is secured to a surface, which is opposite to the placement surface, of the placement portion and connects the outer wall and the inner wall of the groove portion in the second direction, the at least one auxiliary reinforcing member being disposed to sandwich the connecting portion between the at least one auxiliary reinforcing member and the first reinforcing portion of the at least one reinforcing member.

4. The construction machine according to claim 1, further comprising:
   at least one frame member that is attached to a side edge, which intersects with the outer walls, of the top plate and closes a space defined by the outer walls and the placement portions at a side.

5. The construction machine according to claim 1, wherein
the at least one second reinforcing portion of the at least one reinforcing member includes an abutment portion abutting on the bottom and a non-abutment portion that is spaced apart from the bottom and forms a gap with the bottom.

\* \* \* \* \*